United States Patent
Fleck et al.

(10) Patent No.: US 9,151,984 B2
(45) Date of Patent: Oct. 6, 2015

(54) ACTIVE REFLECTIVE SURFACES

(75) Inventors: Rod G. Fleck, Bellevue, WA (US); Andreas G. Nowatzyk, San Jose, CA (US); David D. Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 13/525,649

(22) Filed: Jun. 18, 2012

(65) Prior Publication Data

US 2013/0335671 A1    Dec. 19, 2013

(51) Int. Cl.
*G02F 1/1335* (2006.01)
*G02F 1/1362* (2006.01)
*G02B 27/01* (2006.01)
*B82Y 20/00* (2011.01)

(52) U.S. Cl.
CPC ........ *G02F 1/133553* (2013.01); *G02B 27/017* (2013.01); *G02B 27/0172* (2013.01); *G02F 1/133617* (2013.01); *G02F 1/136277* (2013.01); *B82Y 20/00* (2013.01); *G02B 2027/0112* (2013.01); *G02B 2027/0178* (2013.01)

(58) Field of Classification Search
CPC .................... G02F 1/133571; G02F 1/133514; G02F 1/133617; G02F 1/136277; G02B 27/017; G02B 27/0172
USPC ..................................... 349/106, 113, 63, 15
See application file for complete search history.

(56) References Cited

U.S. PATENT DOCUMENTS

| | | | | |
|---|---|---|---|---|
| 4,822,145 | A * | 4/1989 | Staelin | 349/63 |
| 4,957,351 | A * | 9/1990 | Shioji | 349/15 |
| 5,019,808 | A * | 5/1991 | Prince et al. | 345/88 |
| 5,146,355 | A * | 9/1992 | Prince et al. | 349/71 |
| 5,861,931 | A * | 1/1999 | Gillian et al. | 349/129 |
| 5,940,149 | A | 8/1999 | Vanderwerf | |
| 6,542,307 | B2 | 4/2003 | Gleckman et al. | |
| 6,992,738 | B2 * | 1/2006 | Ishihara et al. | 349/106 |
| 7,048,385 | B2 * | 5/2006 | Beeson et al. | 353/97 |
| 7,301,587 | B2 * | 11/2007 | Uehara et al. | 349/15 |

(Continued)

OTHER PUBLICATIONS

Jacques, Steven L., et al., "Polarized Light Imaging of Tissue", Available at <http://www.lumamed.com/documents/5_polarized%20light%20imaging.pdf>,(2004), 17 pages.

(Continued)

*Primary Examiner* — James Dudek
(74) *Attorney, Agent, or Firm* — Jeremy Snodgrass; Judy Yee; Micky Minhas

(57) ABSTRACT

In embodiments of active reflective surfaces, an imaging structure includes a circuit control layer that controls pixel activation to emit light. A reflective layer of the imaging structure reflects input light from an illumination source. An active color conversion material that is formed on the reflective layer converts the input light to the emitted light. The active color conversion material can be implemented as a phosphorus material or quantum dot material that converts the input light to the emitted light, and in embodiments, the active color conversion material is laminated directly on the reflective layer.

20 Claims, 6 Drawing Sheets

(56) References Cited

U.S. PATENT DOCUMENTS

| | | | |
|---|---|---|---|
| 7,583,327 B2* | 9/2009 | Takatani | 349/15 |
| 7,649,594 B2* | 1/2010 | Kim et al. | 349/71 |
| 7,832,885 B2* | 11/2010 | Hsiao et al. | 362/84 |
| 8,004,621 B2* | 8/2011 | Woodgate et al. | 349/15 |
| 8,092,064 B2* | 1/2012 | Erchak et al. | 362/613 |
| 8,125,579 B2 | 2/2012 | Khan et al. | |
| 8,384,999 B1* | 2/2013 | Crosby et al. | 359/631 |
| 2002/0063820 A1* | 5/2002 | Broer et al. | 349/105 |
| 2008/0106677 A1 | 5/2008 | Kuan et al. | |
| 2008/0303918 A1 | 12/2008 | Keithley | |
| 2009/0015742 A1 | 1/2009 | Liao et al. | |
| 2010/0271467 A1 | 10/2010 | Akeley | |
| 2012/0287381 A1* | 11/2012 | Li et al. | 349/106 |
| 2013/0242056 A1 | 9/2013 | Fleck | |

OTHER PUBLICATIONS

Li, Yan et al., "Design Optimization of Reflective Polarizers for LCD Backlight Recycling", *Journal of Display Technology*, vol. 5, No. 8, Available at <http://ieeexplore.ieee.org/stamp/stamp.jsp?tp=&arnumber=5196840 >,(Aug. 2009), pp. 335-340.

Melcher, R.L. "LCoS for High Performance Displays", In *Proceedings of LEOS 2003*, Available at <http://ieeexplore.ieee.org/stamp/stamp.jsp?tp=&arnumber=1253048>,(Oct. 27, 2003), pp. 812-813.

"Restriction Requirement", U.S. Appl. No. 13/420,388, Aug. 13, 2015, 6 pages.

* cited by examiner

ACTIVE REFLECTIVE SURFACES

BACKGROUND

Many types of devices can be implemented with reflective-type or projection-type displays, such as mobile phones, portable media players, and the like. Additionally, reflective-type or projection-type display devices can be implemented in a head-mounted display (HMD), such as glasses or other wearable display device that has near-eye display panels as lenses to display an augmented or virtual reality environment. As an emerging technology, there are many challenges and design constraints to developing the optics, imaging units, illumination sources, and display devices small and precise enough for implementation with a wearable display device.

Conventional reflective displays and color-based LCOS (liquid crystal on silicon) projection technologies use color filters to convert white or ambient light to red, green, or blue sub-pixels. However, a majority of the light is lost as it twice passes through the color filters, which can result in an approximately 50-70% loss of the light. The remaining 25-50% of the light that does pass through the color filters is further reduced with polarizers in liquid crystal display-type device, and with reflector imperfections, the overall average is ultimately only about 8-17% of the remaining light before projection optics losses.

SUMMARY

This Summary introduces simplified concepts of active reflective surfaces, and the concepts are further described below in the Detailed Description and/or shown in the Figures. This Summary should not be considered to describe essential features of the claimed subject matter, nor used to determine or limit the scope of the claimed subject matter.

Active reflective surfaces are described. In embodiments, an imaging structure includes a circuit control layer that controls pixel activation to emit light. A reflective layer of the imaging structure reflects input light from an illumination source. An active color conversion material that is formed on the reflective layer converts the input light to the emitted light. The active color conversion material can be implemented as a phosphorus material or quantum dot material that converts the input light to the emitted light, and in embodiments, the active color conversion material is laminated directly on the reflective layer.

In other embodiments, the active color conversion material converts a shorter wavelength of the input light to a primary color output of the emitted light. For example, the emitted light is emitted as one or a combination of red, green, and blue (RGB) light, and the active color conversion material converts the input light to the one or combination of the RGB light. The input light can be ambient light or polarized light that is generated as an input to the imaging structure. In embodiments, the imaging structure can be implemented as a component of a liquid crystal on silicon (LCOS) display device or as a reflective liquid crystal display (LCD) device.

BRIEF DESCRIPTION OF THE DRAWINGS

Embodiments of active reflective surfaces are described with reference to the following Figures. The same numbers may be used throughout to reference like features and components that are shown in the Figures.

DETAILED DESCRIPTION

Embodiments of active reflective surfaces are described. An imaging structure can be implemented with an active color conversion material, such as quantum dots or a phosphorous material, to convert input light from an illumination source to emitted light for display. The imaging structure is implemented with the active color conversion material laminated on a reflective layer of the imaging structure rather than with conventional passive absorbing color filters that may absorb as much as 50-70% of the light. This can improve the light output of a display device by a factor of two to four.

In embodiments, the imaging structure with the active color conversion material formed on the reflective layer of the imaging structure can be implemented as any size of display or microdisplay, such as a liquid crystal on silicon (LCOS) display device, as a reflective liquid crystal display (LCD) device, or as a transmissive LCOS display device. By placing the conversion layer directly on or in front of the reflecting surface, the conversion efficiency can be improved by exploiting the standing wave phenomena where the incident and reflected waves interfere constructively one-quarter (¼) of a wavelength in front of the reflective surface, which in turn increases the excitation probability of the conversion material. The standing wave phenomena may also be used to minimize the consumption of expensive materials, such as quantum dots, by concentrating them in constructive interference layer(s).

While features and concepts of active reflective surfaces can be implemented in any number of different devices, systems, environments, and/or configurations, embodiments of active reflective surfaces are described in the context of the following example devices, systems, and methods.

Figure 1:
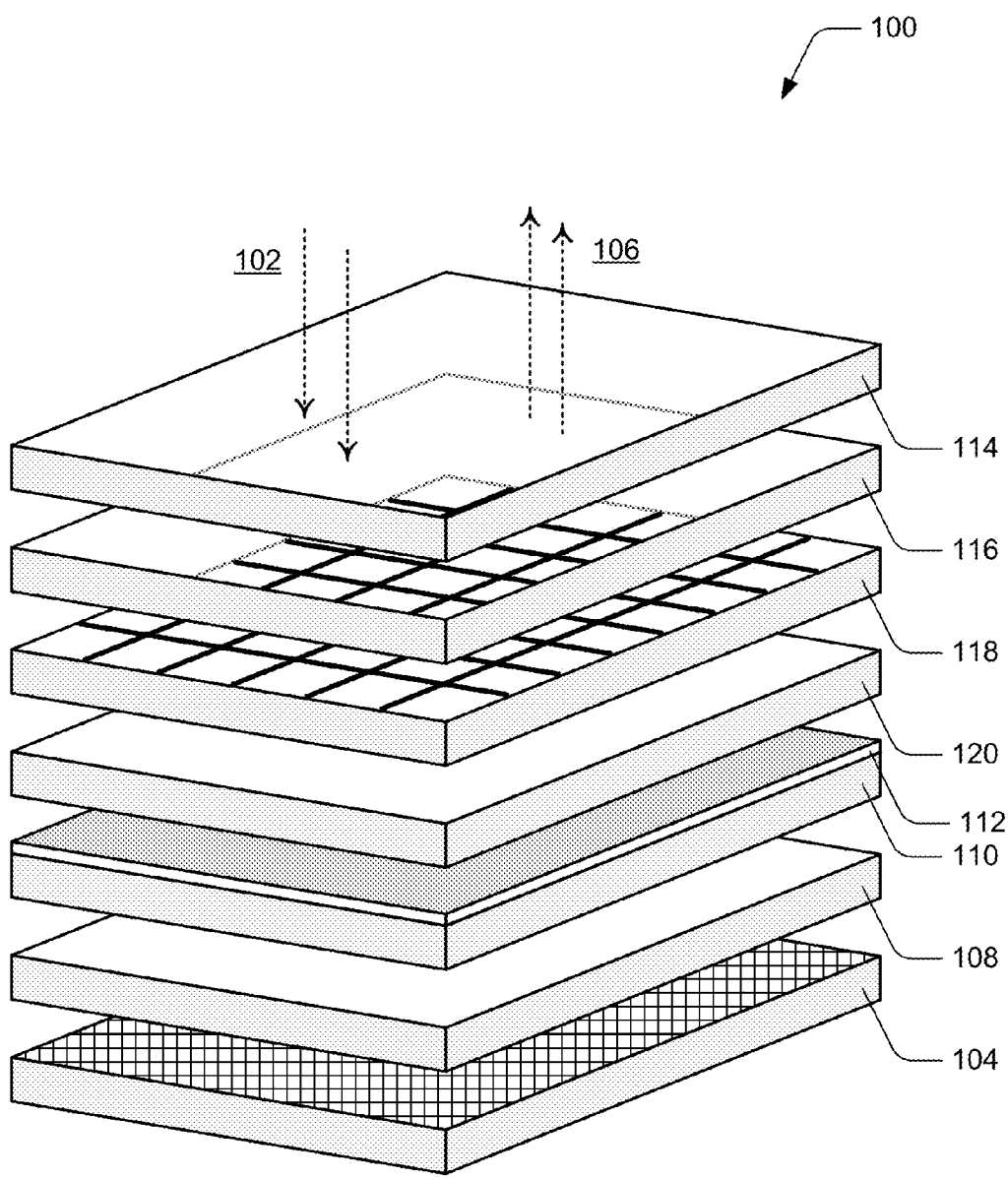
FIG. 1 illustrates an example of an imaging structure with active reflective surfaces in accordance with one or more embodiments.

FIG. 1 illustrates an example of an imaging structure 100 with active reflective surfaces in accordance with one or more embodiments. The imaging structure 100 has material layers that can be implemented as a liquid crystal on silicon (LCOS) display device, and can be implemented as any size of display or microdisplay in various types of devices. Polarized light from an illumination source, such as light emitting diodes (LEDs), is directed as input light 102 with illumination optics into the imaging structure. Alternatively, ambient light may be the illumination source. In implementations, a blue and/or ultra-violet (UV) illumination source can be used for color conversion to red, green, and blue (RGB) (from a UV source) to either front-light a display or directly illuminate the LCOS display device.

An LCOS projection display can utilize LEDs or laser sources to generate the input light 102 that is reflected off of a silicon transistor array covered by a liquid crystal (LC) material to either reflect and/or change the polarization of the light. The LCOS reflective technology uses liquid crystals that are applied to a reflective mirror substrate and, as the liquid crystals open and close, the light is either reflected from a mirror below or blocked to modulate the emitted light. LCOS chips modulate the red, green, and blue (RGB) components of the light, to project the RGB components of the light, such as for display on a display device.

In this example, the imaging structure 100 includes a circuit control layer 104 that controls pixel activation of the display device to emit light 106 that is converted from the input light 102 in the imaging structure. The imaging structure also includes a complementary metal-oxide-semiconductor (CMOS) layer 108 and a reflective layer 110 that reflects the input light from the illumination source. The reflective layer can be implemented as a passive reflector with polished aluminum or mirror surface. In embodiments, an active color conversion material 112 is formed on the reflective layer and is implemented to convert the input light to the emitted light. The active color conversion material is utilized, rather than conventional passive absorbing color filters that may absorb as much as 50-70% of the light.

The active color conversion material 112 can implemented with a phosphorus material or quantum dot (QD) material that is deposited or laminated directly onto the reflective layer. The quantum dot material provides a substantial improvement in color gamut over conventional color filters. The active color conversion material 112 can convert a shorter wavelength of the input light (e.g., UV or blue) to a primary color output of the emitted light. For example, the active color conversion material can convert the input light to be emitted as one or a combination of RGB light. The phosphorus material, or quantum dot material in a multi-layer configuration, can convert incoming ambient or LED light to the primary RGB colors when UV or daylight is input. The photolithographic process allows for multiple different configurations (e.g., stripes, squares, or other) of color conversion.

In implementations, the reflective layer 110 may be shaped to improve light capture and/or light exit directions for the emitted light. A 3D patterning of the reflector may be used to reflect photons more specifically in desired exit directions, such as to allow higher light collection efficiencies into the projection optics at the output of the emitted light 106. A shaped reflective layer can be used to recycle the light that is emitted from the active color conversion material 112 in the direction of the reflective layer 110 since the quantum conversion can exit the light in all directions. The QD or phosphorous materials of the active color conversion material absorb light from any direction and, after conversion, will emit in any direction independent of incoming direction. To then reflect the photons back in the intended direction (e.g., to exit the emitted light), the active color conversion material is formed as close as possible to the reflector, such as laminated directly onto the reflective layer as described above, to allow the majority of back emissions to reflect to the front of the display device.

In this example, the imaging structure 100 also includes a glass layer 114, a transparent layer 116, an alignment layer 118, and a light gating system 120. The light gating system 120 can be a liquid crystal layer that either blocks the input light 102 or allows all or a portion of the light to continue through to the reflective layer 110. The light gating system 120 can be implemented as the LC material (e.g., polarizing TN/VA/IPS or PDLC-based), as an electro-wetting implementation, a micro-electro-mechanical systems (MEMS) mirror, and the like to gate the input light through to the active color conversion material 112 and the reflective layer 110. The light gating system 120 in the imaging structure may also be implemented with non-polarizer based LC materials, such as a polymer dispersed liquid crystal (PDLC), a Blue-phase mode LC material, or other non-polarizing materials to gate or block the input light to the imaging structure.

Additionally, the imaging structure 100 may include a dual brightness enhancement film (DBEF), reflecting polarizer, or similar material that is implemented between the active color conversion material 112 and the light gating system 120 to recycle the light that does not have a desired polarization. Further, for polarized input light, the polarization of the light will be lost after quantum conversion. Thus, reflecting polarizing material positioned above the active color conversion material 112, along with the reflective layer 110 below the active color conversion material, recycles the light until it exits in the intended polarized direction.

In implementations, the active color conversion material 112 may have wavelength spectral efficiency differences based on the incoming light. A gamma-correction table, piecewise linear, or multiplier can be used to adjust the light gating system 120 using a combination of the desired output level and corrections computed for the illumination source that is used. This corrected value can then be driven to the control layer 104 (e.g., an active matrix) which is applied to each sub-pixel of the display device. The corrections can also be performed on ambient light based on color specific ambient light sensing (ALS) devices. As noted above, ambient light may be the illumination source of the input light. Additional corrections (e.g., gamma corrections) may be implemented to either further open or close the gating elements to make up for color temperature differences in the ambient light. The correction coefficients can be generated based on color-based ambient light detection sensors. Color ambient light sensing can be utilized to adjust each light gating mechanism of the light gating layer 120 on a sub-pixel basis for selected color conversion materials and dynamic ambient light to improve the color accuracy, color gamut, and overall quality.

Figure 2:
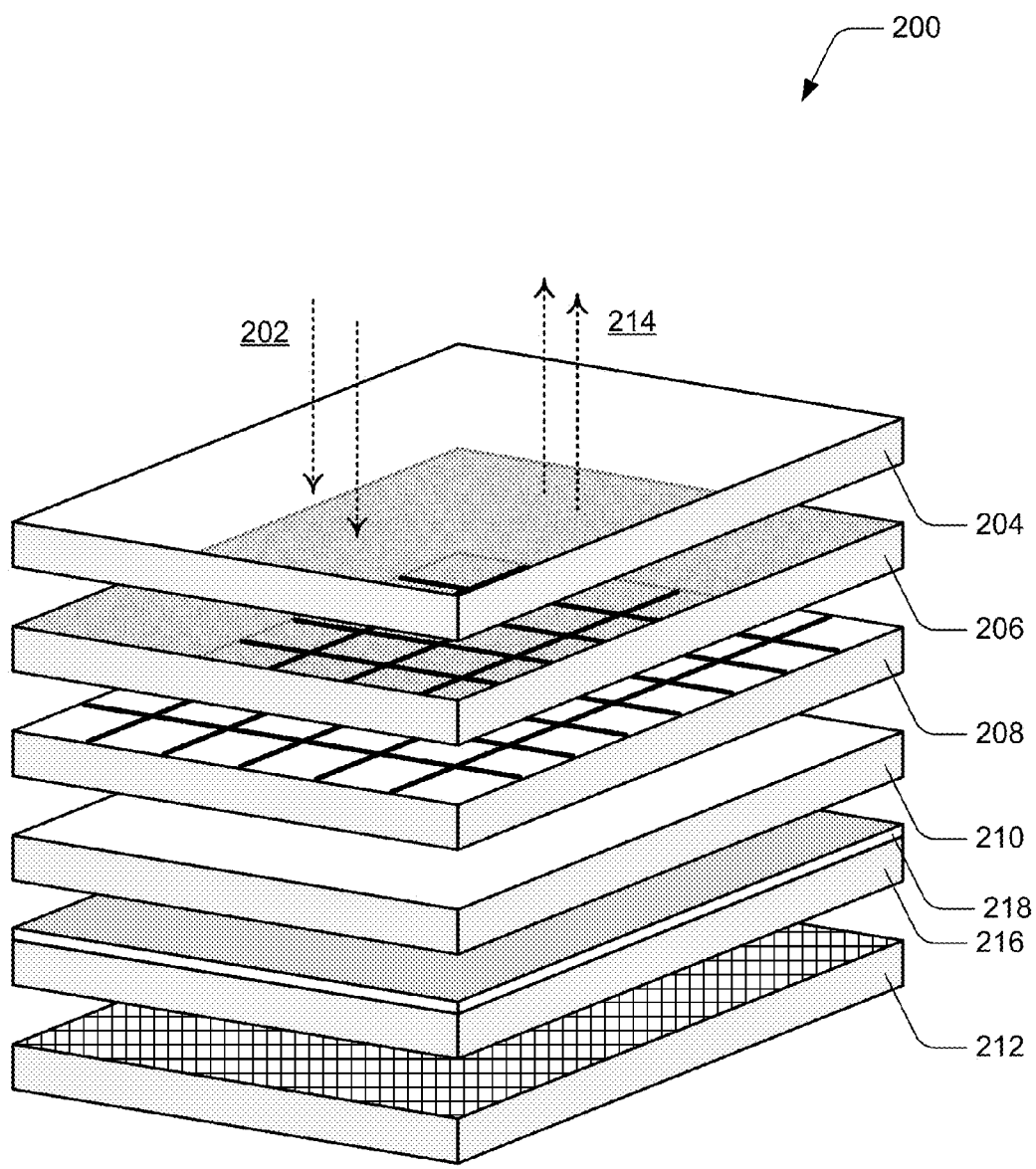
FIG. 2 illustrates another example of an imaging structure with active reflective surfaces in accordance with one or more embodiments.

FIG. 2 illustrates another example of an imaging structure 200 with active reflective surfaces in accordance with one or more embodiments. The imaging structure 200 has material layers that can be implemented as a reflective liquid crystal display (LCD) device, and can be implemented as any size of display or microdisplay in various types of devices. Light from an illumination source or incident light is directed as input light 202 with illumination optics into the imaging structure. The incident light passes through a glass layer 204, a polarizer 206, and a film layer 208 to a liquid crystal layer 210 that gates the input light (e.g., passes through or absorbs the light) depending on an intended pixel output of the display device.

In this example, the imaging structure 200 also includes a control layer 212, such as a thin film transistor (TFT) layer, that controls pixel activation of the display device to emit light 214 that is converted from the input light 202 in the imaging structure. The imaging structure also includes a reflective layer 216 that reflects the input light from the illumination source. The reflective layer can be implemented as a passive reflector with polished aluminum or mirror surface. In implementations, the reflective layer 216 may be shaped to improve light capture and/or light exit directions for the emitted light. A 3D patterning of the reflector may be used to reflect photons more specifically in intended exit directions, such as to allow higher light collection efficiencies into the projection optics at the output of the emitted light.

In embodiments, an active color conversion material 218 is formed on the reflective layer 216 and is implemented to convert the input light to the emitted light. The active color conversion material is utilized, rather than conventional passive absorbing color filters that may absorb as much as 50-70% of the light. The active color conversion material 218 can implemented with a phosphorus material or quantum dot (QD) material that is deposited or laminated directly onto the reflective layer. The quantum dot material provides a substantial improvement in color gamut over conventional color filters. The active color conversion material 218 can convert a shorter wavelength of the input light (e.g., UV or blue) to a primary color output of the emitted light. For example, the active color conversion material can convert the input light to be emitted as one or a combination of RGB light.

Figure 3:
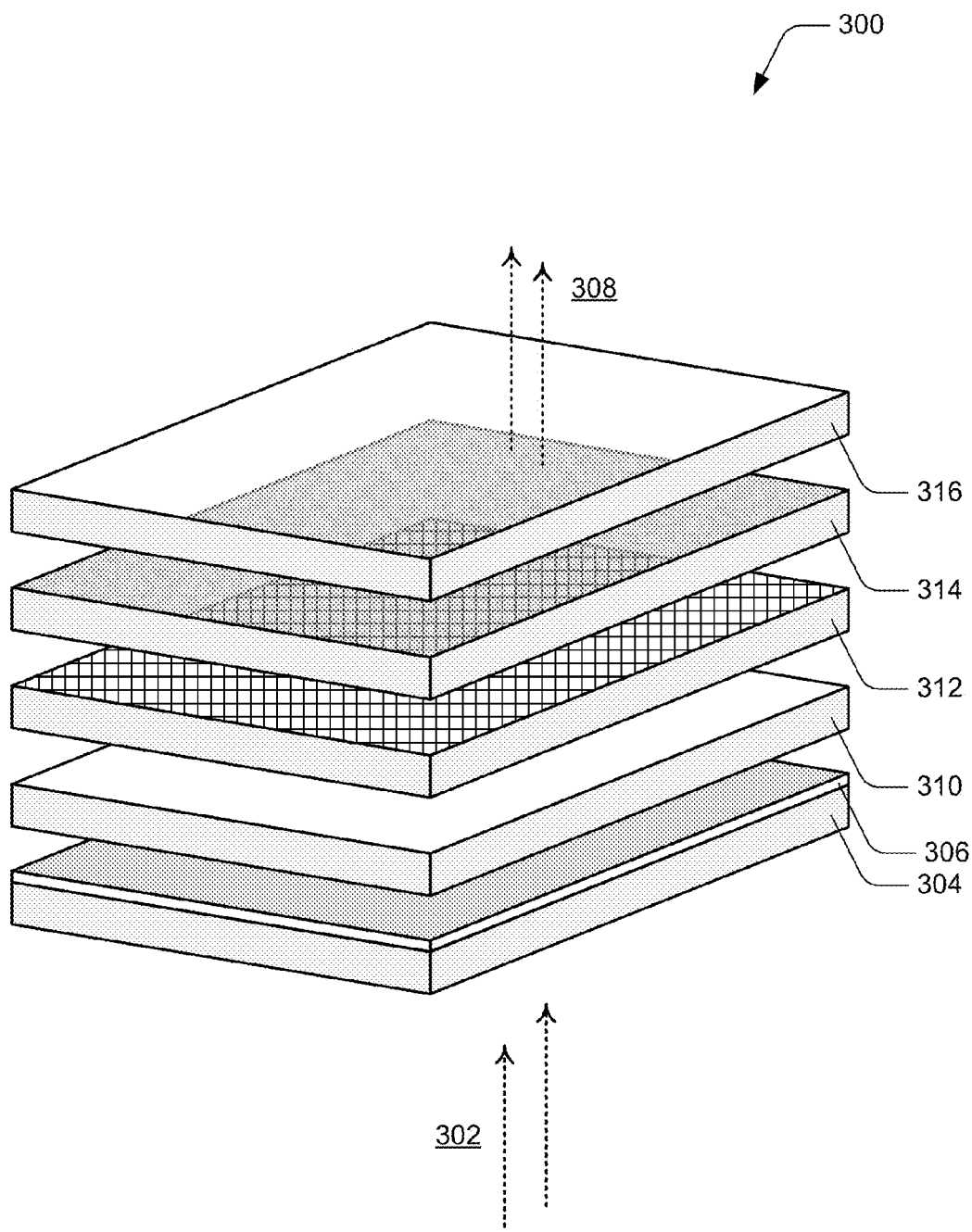
FIG. 3 illustrates another example of an imaging structure with active reflective surfaces in accordance with one or more embodiments.

FIG. 3 illustrates another example of an imaging structure 300 with active reflective surfaces in accordance with one or more embodiments. The imaging structure 300 has material layers that can be implemented as a transmissive LCOS display device, and can be implemented as any size of display or microdisplay in various types of devices. Light from an illumination source, such as direct illumination or lightguide directed light, is directed as input light 302 with illumination optics into the imaging structure. The input light passes through a dichroic mirror structure 304, which can be used to allow UV or blue to pass through, and reflect red, green, and blue (RGB), such as if UV or deep blue is the input light.

In embodiments, an active color conversion material 306 is formed on the dichroic mirror structure 304 and is implemented to convert the input light 302 to emitted light 308. The active color conversion material is utilized, rather than conventional passive absorbing color filters that may absorb as much as 50-70% of the light. The active color conversion material 306 can implemented with a phosphorus material or quantum dot (QD) material that is deposited or laminated directly onto the dichroic mirror structure. The active color conversion material 306 can convert the input light to output the emitted light, such as one or a combination of RGB light.

In this example, the imaging structure 300 includes a light gating system 310 that either blocks the converted light from the active color conversion material 306, or allows all or a portion of the light to continue through the imaging structure. The light gating system 310 can be implemented as a liquid crystal (LC) material (e.g., polarizing TN/VA/IPS or PDLC-based), as an electro-wetting implementation, a micro-electro-mechanical systems (MEMS) mirror, and the like to gate the converted light through the imaging structure. The light gating system 310 in the imaging structure may also be implemented with non-polarizer based LC materials, such as a polymer dispersed liquid crystal (PDLC), a Blue-phase mode LC material, or other non-polarizing materials to gate or block the input light in the imaging structure. In a non-polarizer based system, the electro-wetting implementation and MEMS mirror can be operable in a transmissive mode without polarizers.

The imaging structure 300 then includes a control layer 312, such as a thin film transistor (TFT) layer, that controls pixel activation of the display device to emit light 308 that is converted from the input light 302 in the imaging structure. The imaging structure can include a polarizer 314 (e.g., for an implementation of LC material), and may also include one or more micro-lens structures 316 above the control layer.

Figure 4:
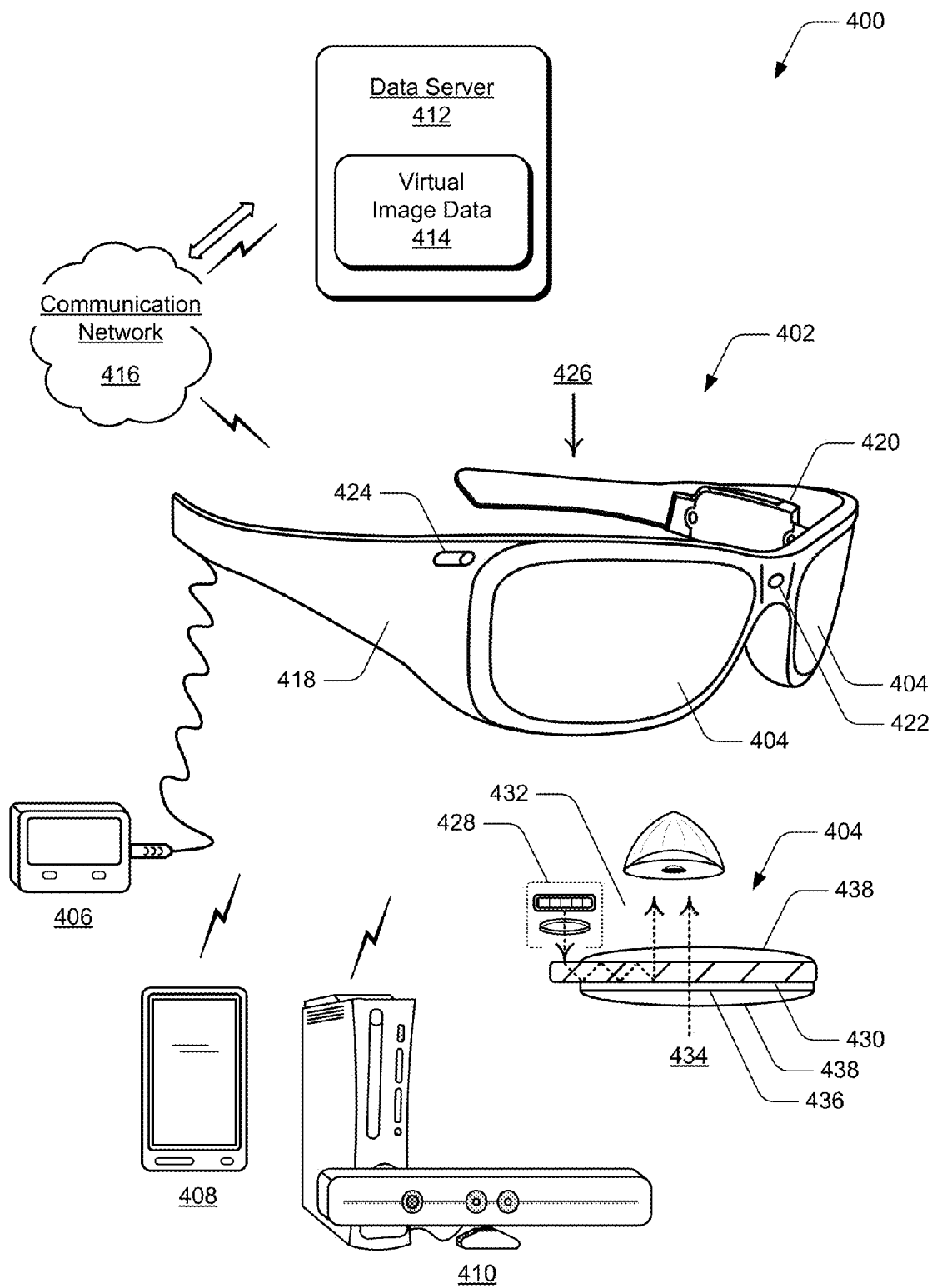
FIG. 4 illustrates an example system that includes an example of a wearable display device in which embodiments of active reflective surfaces can be implemented.

FIG. 4 illustrates an example system 400 that includes an example wearable display device 402 in which embodiments of active reflective surfaces can be implemented. The wearable display device can be implemented as any type of glasses or head-mounted display (HMD) that includes display lens systems 404 (e.g., left and right display lens systems) through which a user can view the surrounding environment, yet also see virtual images (e.g., any type of object, video, text, graphic, and the like) that are generated for display and appear as a part of the environment.

The wearable display device 402 can be implemented as an independent, portable system that includes memory, software, a processor, and/or a power source. Alternatively or in addition, the wearable display device may be communicatively linked to a controller 406 that includes any one or combination of the memory, software, processor, and/or power source, such as a battery unit. The controller can be implemented for wired or wireless communication with the wearable display device. The controller and/or the wearable display device can also be implemented with any number and combination of differing components as further described with reference to the example device shown in FIG. 6. For example, the controller and/or the wearable display device includes an imaging application implemented as computer-executable instructions, such as a software application, and executed by a processor to implement embodiments of active reflective surfaces as described herein.

In embodiments, the controller may be implemented as a dedicated device (e.g., the wired controller 406), as a mobile phone 408, a tablet or other portable computer device, a gaming system 410, or as any other type of electronic device that can be implemented to process and generate virtual images for display as part of the environment that is viewed through the display lens systems of the wearable display device. The controller can be implemented to communicate with the wearable display device wirelessly via WiFi™, Bluetooth™, infrared (IR), RFID transmission, wireless Universal Serial Bus (WUSB), cellular, or via other wireless communication techniques.

The example system 400 also includes a data server 412, or data service, that communicates, or otherwise distributes, virtual image data 414 to the wearable display device 402 via a communication network 416. For example, the data server may be part of a network-based gaming system that generates virtual images for virtual reality and/or augmented reality display at the wearable display device. Alternatively, the data server may be part of a navigation system that communicates navigation directions and information for display in the display lens systems 404 of the wearable display device. In another example, the data server may be part of a messaging service, such as an e-mail or text messaging system, that communicates e-mail and/or text messages to the wearable display device for display in the display lens systems, where a user can read a message as an augmented reality image that is displayed over the environment viewed through the wearable display device.

Any of the devices, servers, and/or services can communicate via the communication network 416, which may be implemented to include wired and/or wireless networks. The communication network can also be implemented using any type of network topology and/or communication protocol, and can be represented or otherwise implemented as a combination of two or more networks, to include IP-based networks and/or the Internet. The communication network may also include mobile operator networks that are managed by mobile operators, such as a communication service provider, cell-phone provider, and/or Internet service provider.

The wearable display device 402 includes a frame 418, such as in the form of glasses, goggles, or any other structure, that supports and incorporates the various components of the device, as well as serves as a conduit for electrical and other component connections. A components module 420 (or components modules on the left, right, and/or both sides of the device frame) incorporates any of the various components, such as processing and control circuitry, memory, software, a processor, GPS transceiver, and/or power source. The wearable display device may also include a microphone 422 to record audio data from the surrounding environment, as well as ear phones for audio feedback as part of an augmented reality experience.

The wearable display device 402 also includes various cameras 424 that capture video and still images of the surrounding environment. The image and video data can be processed on the device and/or by a controller device (e.g., controller 406), and used to create a mapping field to orient and track a user in the environment space. The wearable display device can also include eye-tracking cameras used to determine a user eyeball and/or pupil location, and to track eye movements. The wearable display device may also include a temperature sensor, as well as inertial sensors and/or attitude sensors, including MEMS gyros, magnetic sensors (e.g., a compass), and acceleration sensors for sensing position, orientation, and acceleration of the wearable display device.

An example of one display lens system 404 is shown from a viewer perspective 426 of the wearable display device 402, as if viewing the display lens system from the top of the device. The display lens system includes an imaging unit 428, which can be implemented with any number of micro display panels, lenses, and reflecting elements to display and project a virtual image into a see-through and reflecting waveguide 430. The see-through, reflecting waveguides 430 are implemented for internal reflection and conduct the visible light 432 of a virtual image that is generated by the imaging unit for viewing by a user, and also pass through the light 434 from the surrounding environment for viewing by the user.

The micro display panels, lenses, and/or reflecting elements of the imaging unit 428 can be implemented with various display technologies, such as implemented with a transparent LCD, or using a transmissive projection technology. These technologies can be implemented using LCD type displays with powerful backlights and high optical energy densities. Alternatively, a micro display and/or reflecting element can be implemented using a reflective technology, such as digital light processing (DLP) and liquid crystal on silicon (LCOS), that reflects external light, which is reflected and modulated by an optical material. In embodiments, a display lens system 404 can include any of the imaging structures described with reference to FIGS. 1-3.

Additionally, the imaging units 428 (or other components of a display lens system 404) can be implemented to include an infra-red (IR) laser utilized for system calibrations and/or as an illumination source for an eye-tracking system and camera that tracks the position of a user's eyes and/or pupils. The eye-tracking system includes the eye-tracking illumination source, which is not a visible light, and includes an eye-tracking IR sensor. The IR sensor can be implemented as an IR camera that provides infrared image data of the eye for eye-tracking processing, or an IR sensor that detects eye reflections when the eye is illuminated. Alternatively or in addition, sensors can be implemented in a CMOS driver array to detect the feedback. The see-through and reflecting waveguides 430 can also be utilized for the infrared illumination, and for eyeball reflections that the eye-tracking system uses to track the position of the user's eyes and/or pupils.

In this example, the display lens systems 404 include an optional opacity filter 436, and a see-through lens 438 on each side of the waveguides 430. The see-through lenses can be standard eye-glass lenses and made to prescription (or no prescription). The opacity filter selectively blocks natural light, either uniformly or on a per-pixel basis, from passing through the see-through and reflecting waveguide to enhance the contrast of a displayed virtual image.

Example method 500 is described with reference to FIG. 5 in accordance with one or more embodiments of active reflective surfaces. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 5:
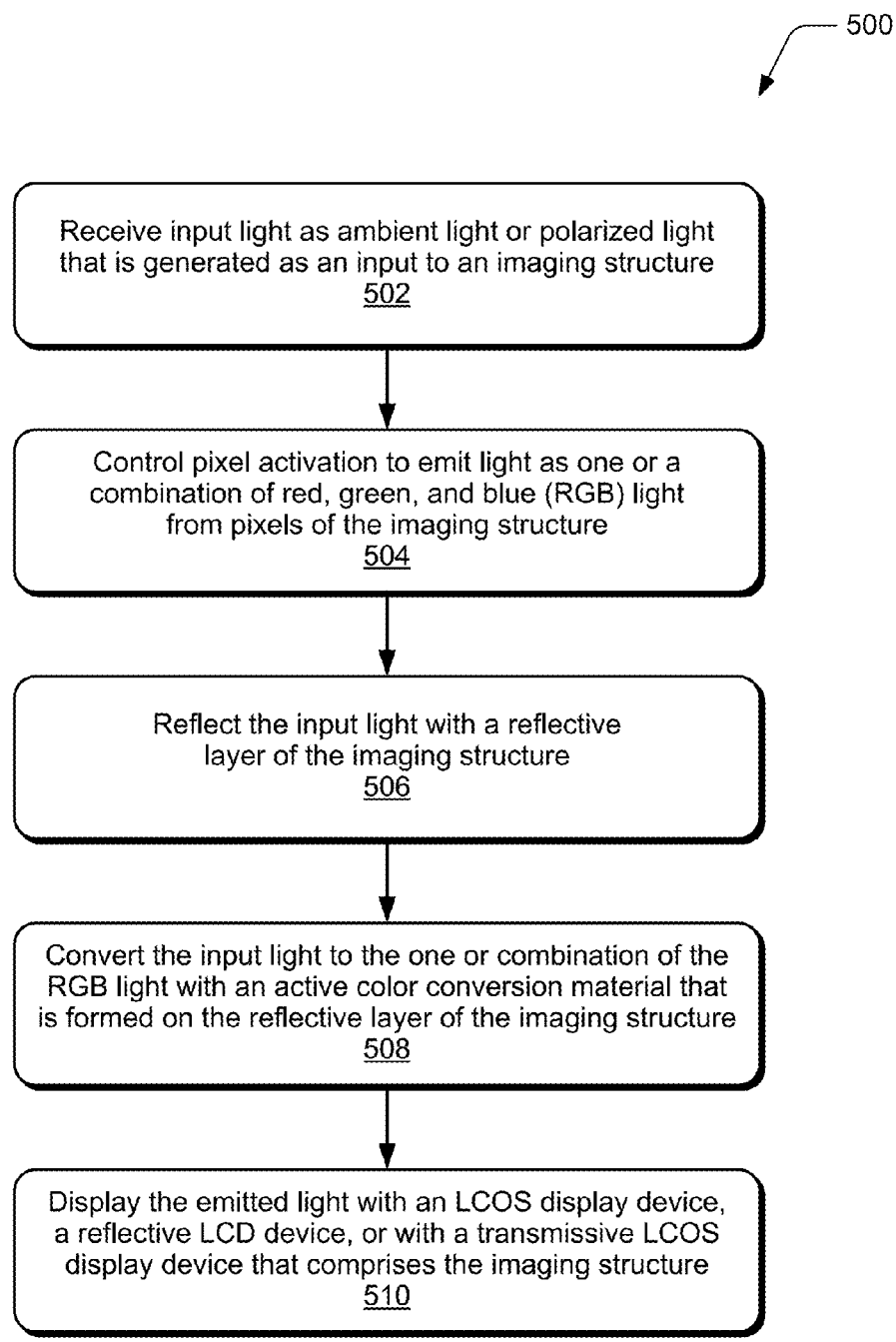
FIG. 5 illustrates example method(s) of active reflective surfaces in accordance with one or more embodiments.

FIG. 5 illustrates example method(s) 500 of active reflective surfaces. The order in which the method blocks are described are not intended to be construed as a limitation, and any number of the described method blocks can be combined in any order to implement a method, or an alternate method.

At block 502, input light is received as ambient light or polarized light that is generated as an input to an imaging structure. For example, the input light 102 (FIG. 1) is received as polarized light that is generated by an illumination source and directed as an input to the imaging structure 100. Similarly, the input light 202 (FIG. 2) is received as ambient light that is input to the imaging structure 200, and the input light 302 (FIG. 3) is received as direct illumination or lightguide directed light as an input to the imaging structure 300.

At block 504, pixel activation is controlled to emit light as one or a combination of red, green, and blue (RGB) light from pixels of the imaging structure. For example, the circuit control layer 104 controls pixel activation of the LCOS display device to emit light 106 that is converted from the input light 102 in the imaging structure 100. Similarly, the control layer 212 (e.g., a TFT layer) controls pixel activation of the reflective LCD device to emit light 214 that is converted from the input light 202 in the imaging structure 200. Further, the control layer 312 (e.g., a TFT layer) controls pixel activation of the transmissive LCOS display device to emit light 308 that is converted from the input light 302 in the imaging structure 300.

At block 506, the input light is reflected with a reflective layer of the imaging structure. For example, the reflective layer 110 of the imaging structure 100 reflects the input light 202 from the illumination source (e.g., LEDs). Similarly, the reflective layer 216 of the imaging structure 200 reflects the input light 202 from the illumination source (e.g., ambient light). Further, the dichroic mirror structure 304 of the imaging structure 300 reflects the input light 302 from the illumination source (e.g., direct illumination or lightguide directed light).

At block 508, the input light is converted to the one or combination of the RGB light with an active color conversion material that is formed on the reflective layer of the imaging structure. For example, the active color conversion material 112 of the imaging structure 100 is formed on the reflective layer 110 and converts the input light 102 to the emitted light 106. Similarly, the active color conversion material 218 of the imaging structure 200 is formed on the reflective layer 216 and converts the input light 201 to the emitted light 214. Further, the active color conversion material 306 of the imaging structure 300 is formed on the dichroic mirror structure 304 and converts the input light 302 to the emitted light 308. The active color conversion material can be phosphorus material or quantum dot material that is laminated directly on the reflective layer, and the active color conversion material converts a shorter wavelength of the input light to a primary color output of the emitted light.

At block 510, the emitted light is displayed with an LCOS display device, a reflective LCD device, or with a transmissive LCOS display device that comprises the imaging structure. For example, the imaging structure 100 can be implemented as a liquid crystal on silicon (LCOS) display device, the imaging structure 200 can be implemented as a reflective liquid crystal display (LCD) device, and the imaging structure 300 can be implemented as a transmissive LCOS display device.

Figure 6:
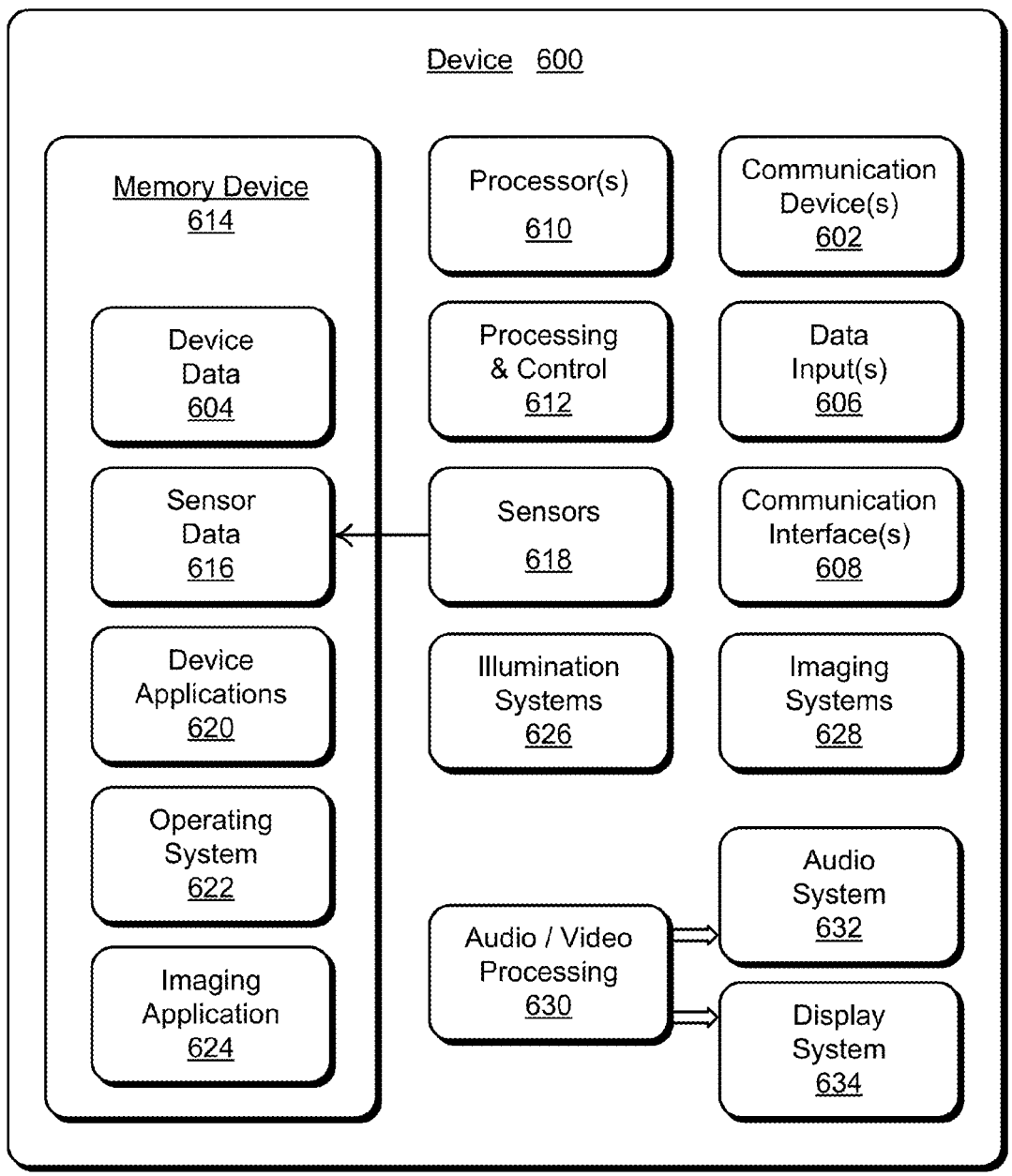
FIG. 6 illustrates various components of an example device that can implement embodiments of active reflective surfaces.

FIG. 6 illustrates various components of an example device 600 that can be implemented as any of the devices described with reference to the previous FIGS. 1-5, such as a wearable display device and/or a controller for a wearable display device. In embodiments, the device may be implemented as any one or combination of a fixed or mobile device, in any form of a consumer, computer, portable, communication, phone, navigation, appliance, gaming, media playback, and/or electronic device. The device may also be associated with a user (i.e., a person) and/or an entity that operates the device such that a device describes logical devices that include users, software, firmware, hardware, and/or a combination of devices.

The device 600 includes communication devices 602 that enable wired and/or wireless communication of device data 604, such as virtual image data, camera imaging data, and other media content (e.g., video and/or images) stored on the device. The media content stored on the device can include any type of audio, video, and/or image data. The device includes one or more data inputs 606 via which any type of data, media content, and/or inputs can be received, such as user-selectable inputs and any other type of audio, video, and/or image data received from any content and/or data source. The data inputs 606 may include USB ports, coaxial cable, and other serial or parallel connectors (including internal connectors) for flash memory, DVDs, CDs, and the like. The data inputs can be used to couple the device to components, peripherals, and accessories, such as keyboards, microphones, cameras, and any other type of input devices.

The device 600 also includes communication interfaces 608, such as any one or more of a serial, parallel, network, or wireless interface. The communication interfaces provide a connection and/or communication links between the device and a communication network by which other electronic, computing, and communication devices communicate data with the device. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 includes one or more processors 610 (e.g., any of microprocessors, controllers, and the like), or a processor and memory system (e.g., implemented in an SoC), which process computer-executable instructions to control the operation of the device. Alternatively or in addition, the device can be implemented with any one or combination of software, hardware, firmware, or fixed logic circuitry that is implemented in connection with processing and control circuits which are generally identified at 612.

The device 600 also includes one or more memory devices 614 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 614 provides data storage mechanisms to store the device data 604, sensor data 616 from sensors 618 and other data input devices, such as cameras, other types of information and/or data, and device applications 620. For example, an operating system 622 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications also include an imaging application 624 that controls illumination systems 626 and imaging systems 628 of the device.

The device 600 may also include an audio and/or video processing system 630 that generates audio data for an audio system 632 and/or generates display data for a display system 634. The audio system and/or the display system may include any devices that process, display, and/or otherwise render audio, video, display, and/or image data. In implementations, the audio system and/or the display system are external components to the device. Alternatively, the audio system and/or the display system are integrated components of the example device.

Although embodiments of active reflective surfaces have been described in language specific to features and/or methods, the appended claims are not necessarily limited to the specific features or methods described. Rather, the specific features and methods are disclosed as example implementations of active reflective surfaces.

The invention claimed is:

1. An imaging structure, comprising:
   a circuit control layer configured to control pixel activation to emit light;
   a reflective layer configured to reflect input light from an illumination source;
   a light gating system configured to block or allow the input light through the imaging structure to the reflective layer; and
   an active color conversion material formed on the reflective layer and configured to convert the input light to the emitted light.

2. An imaging structure as recited in claim 1, wherein the active color conversion material is laminated directly on the reflective layer and is one of phosphorus material or quantum dot material configured to convert the input light to the emitted light.

3. An imaging structure as recited in claim 1, wherein the active color conversion material is configured to convert a shorter wavelength of the input light to a primary color output of the emitted light.

4. An imaging structure as recited in claim 1, wherein:
   the emitted light is emitted as one or a combination of red, green, and blue (RGB) light; and the active color conversion material is configured to convert the input light to the one or combination of the RGB light.

5. An imaging structure as recited in claim 1, wherein the imaging structure is a liquid crystal on silicon (LCOS) display device configured to display the emitted light.

6. An imaging structure as recited in claim 1, wherein the imaging structure is a reflective liquid crystal display (LCD) device configured to display the emitted light.

7. An imaging structure as recited in claim 1, wherein the imaging structure is a transmissive liquid crystal on silicon (LCOS) display device configured to display the emitted light.

8. An imaging structure as recited in claim 1, wherein the light gating system comprises one of a polarized liquid crystal (LC) material, a non-polarized LC material, an electro-wetting material, or a micro-electro-mechanical systems (MEMS) mirror.

9. A method, comprising:
controlling pixel activation to emit light as one or a combination of red, green, and blue (RGB) light from pixels of an imaging structure;
reflecting input light from an illumination source with a reflective layer of the imaging structure;
controlling the input light from the illumination source with a light gating system that blocks or allows the input light to reach the reflective layer; and
converting the input light to the one or combination of the RGB light with an active color conversion material that is deposited directly onto the reflective layer of the imaging structure.

10. A method as recited in claim 9, wherein the active color conversion material is one of phosphorus material or quantum dot material configured in a multi-layer configuration to convert the input light to the emitted light.

11. A method as recited in claim 9, wherein the active color conversion material is laminated directly on the reflective layer.

12. A method as recited in claim 9, wherein the active color conversion material is configured to convert a shorter wavelength of the input light to a primary color output of the emitted light.

13. A method as recited in claim 9, further comprising displaying the emitted light with a liquid crystal on silicon (LCOS) display device that comprises the imaging structure.

14. A method as recited in claim 9, further comprising displaying the emitted light with a reflective liquid crystal display (LCD) device that comprises the imaging structure.

15. A method as recited in claim 9, further comprising displaying the emitted light with a transmissive liquid crystal on silicon (LCOS) display device that comprises the imaging structure.

16. A wearable display device, comprising:
left and right imaging units configured to generate a virtual image for display;
each of the left and right imaging units including an imaging structure that comprises:
a reflective layer configured to reflect input light from an illumination source of an imaging unit;
a light gating system configured to block or allow the input light from the illumination source through the imaging structure; and
an active color conversion material laminated directly onto the reflective layer and configured to convert the input light to display as the virtual image.

17. A wearable display device as recited in claim 16, wherein the active color conversion material is one of phosphorus material or quantum dot material configured in a multi-layer configuration to convert the input light to display as the virtual image.

18. A wearable display device as recited in claim 16, wherein the active color conversion material is laminated directly on the reflective layer.

19. A wearable display device as recited in claim 16, wherein:
emitted light is emitted from the imaging structure as one or a combination of red, green, and blue (RGB) light; and
the active color conversion material is configured to convert the input light to the one or combination of the RGB light.

20. A wearable display device as recited in claim 16, wherein the left and right imaging units each comprise the imaging structure as one of:
a liquid crystal on silicon (LCOS) display device configured to display the virtual image;
a reflective liquid crystal display (LCD) device configured to display the virtual image; or
a transmissive LCOS display device configured to display the virtual image.

* * * * *